March 21, 1972 W. D. FINNEGAN 3,650,941
ELECTROLYTIC REDUCTION CELL
Original Filed Sept. 23, 1968 2 Sheets-Sheet 1
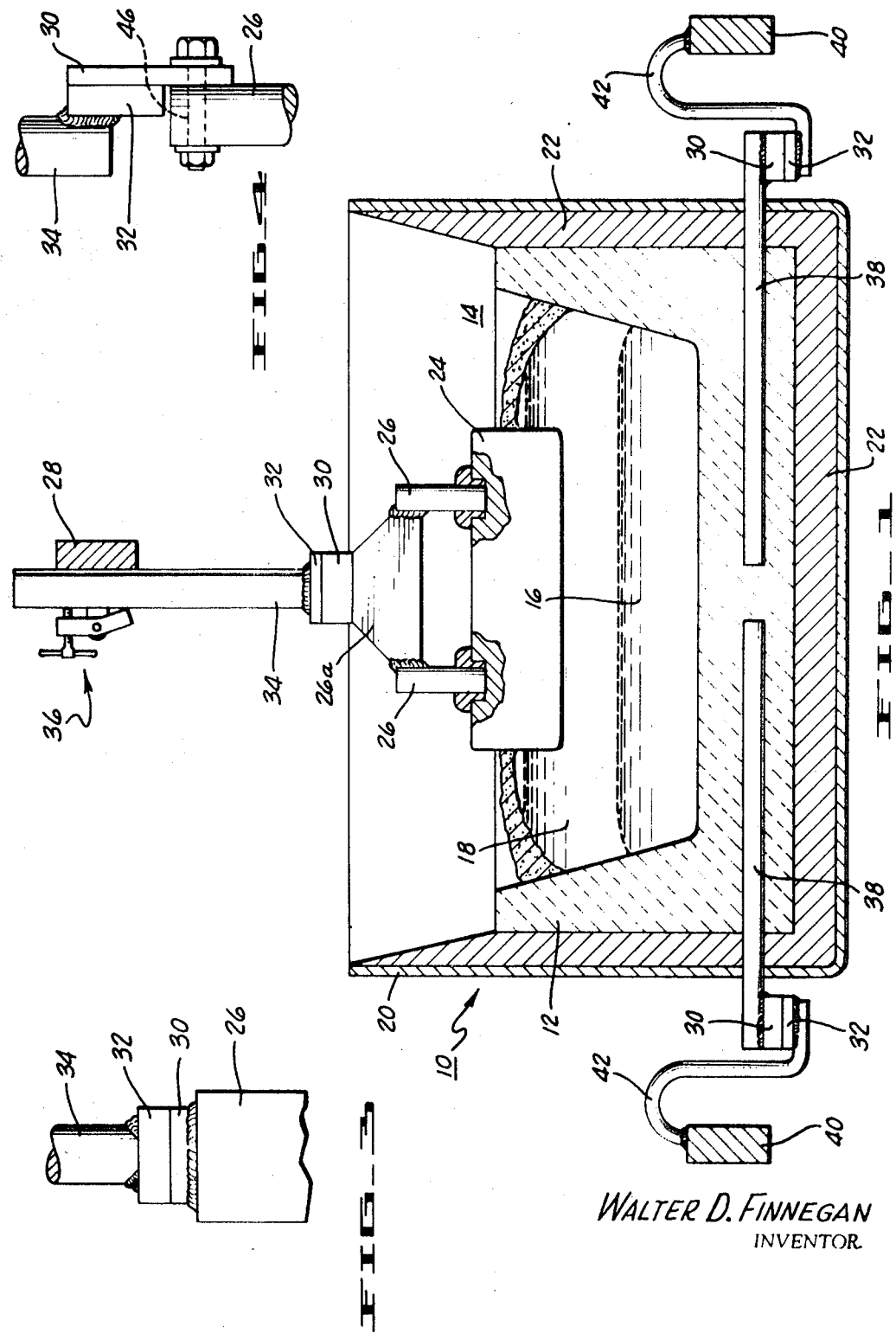
WALTER D. FINNEGAN
INVENTOR.

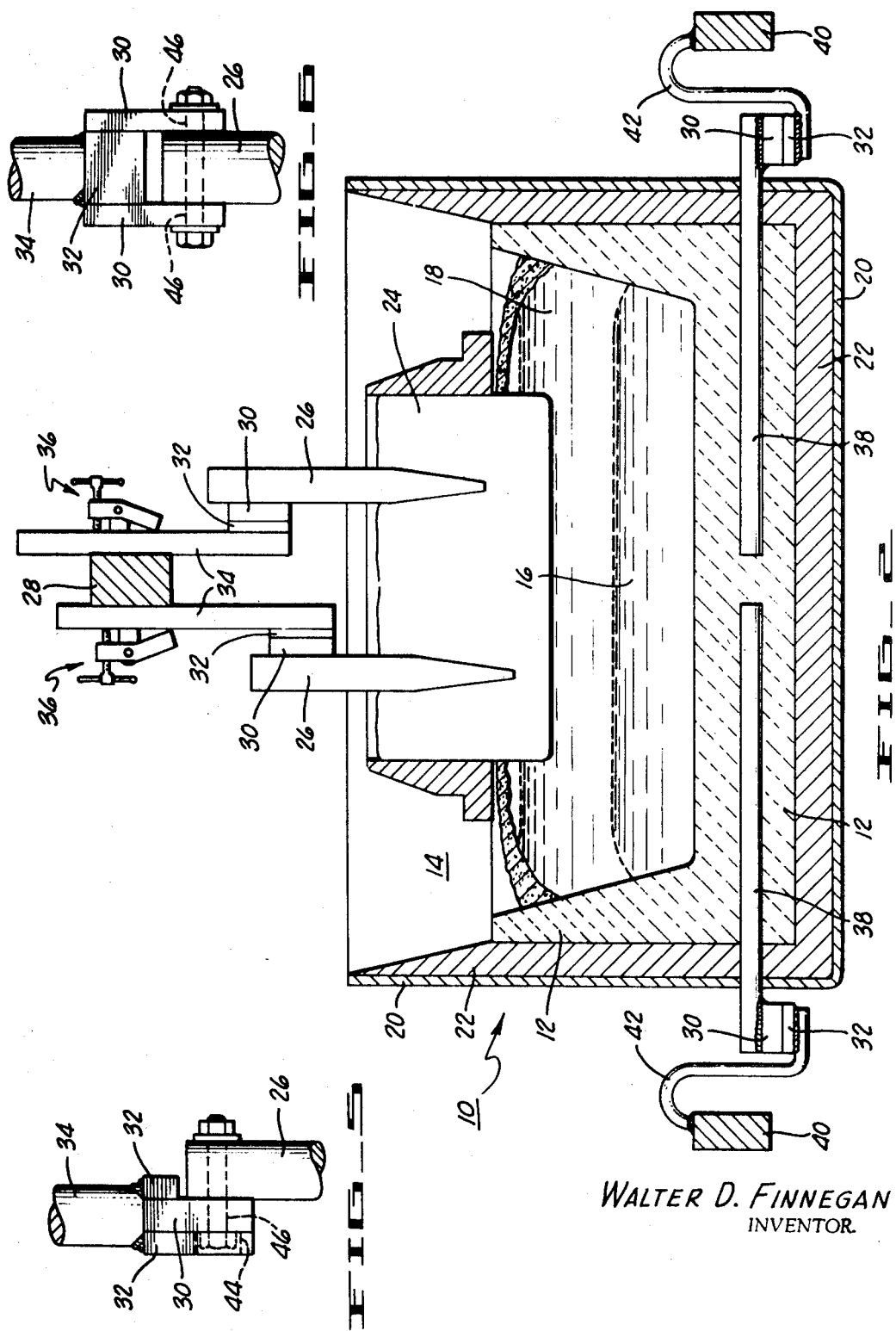

United States Patent Office 3,650,941
Patented Mar. 21, 1972

3,650,941
ELECTROLYTIC REDUCTION CELL
Walter D. Finnegan, Spokane, Wash., assignor to Kaiser Aluminum & Chemical Corporation, Oakland, Calif.
Original application Sept. 23, 1968, Ser. No. 761,421, now Patent No. 3,579,432, dated May 18, 1971. Divided and this application July 24, 1970, Ser. No. 64,865
Int. Cl. C22d *3/02;* B01k *3/04*
U.S. Cl. 204—243 R 2 Claims

ABSTRACT OF THE DISCLOSURE

A composite electrical conductor adapted to contact an electrode in current transmitting engagement. A ferrous metal plate is affixed to the free end of a ferrous metal rod adapted to be embedded in the electrode. A soft aluminous plate is roll bonded along one face to the ferrous plate affixed to the rod. An aluminum conductor rod is welded to the aluminous plate roll bonded to the ferrous plate and is adapted to be connected to a source of electric current.

---

This is a division of application Ser. No. 761,421, filed Sept. 23, 1968, now U.S. No. 3,579,432.

BACKGROUND OF THE INVENTION

This invention relates to electrical conductors useful in electrolytic cells employing electrodes supported by individual bars or rods of conductor material. It is particularly applicable to electrolytic cells for the reduction of aluminum containing compounds, e.g. alumina, for the production of aluminum.

The metal aluminum is extracted from aluminum-bearing compounds such as alumina ($Al_2O_3$) by electrolysis from a molten salt bath or electrolyte. In the production of aluminum by the conventional electrolytic process, commonly referred to as the Hall-Heroult process, the electrolytic cell comprises in general a steel shell having disposed therein a carbon lining. The bottom of the carbon lining together with a layer of electrolytically produced molten aluminum which collects thereon during operation serves as the cathode. One or more consumable carbon electrodes is disposed from the top of the cell and is immersed at its lower extremity into a layer of molten electrolyte which is disposed in the cell. In operation, the electrolyte or bath, which is a mixture of alumina and cryolite, is charged to the cell and an electric current is passed through the cell from the anode to the cathode via the layer of molten electrolyte. The alumina is dissociated by the current so that aluminum is deposited on the liquid aluminum cathode and oxygen is liberated at the carbon anode, forming carbon monoxide and carbon dioxide gas. A crust of solidified electrolyte and alumina forms on the surface of the bath, and this is usually covered over with additional alumina.

In the conventional electrolytic process, use has been made of two types of electrolytic cells, namely that commonly referred to as a "prebake" cell and that commonly referred to as a Soderberg cell. With either cell, the reduction process involves precisely the same chemical reactions. The principal difference is one of structure. In the prebaked cell, the carbon anodes are prebaked before being installed in the cell while in the Soderberg, or self-baking anode cell, the anode is baked in situ, that is, it is baked during operation of the electrolytic cell, thereby utilizing part of the heat generated by the reduction process. The instant invention is applicable to either cell.

As has been discussed above, a carbon anode is used in aluminum reduction cells. The electrical current required to effect reduction is conveyed from a bus bar through an anode rod assembly to the stub of ferrous metal embedded in and supporting the anode. Normally, the anode rod consists of a rectangular copper bar or rod that is joined to the ferrous stub. In some instances the copper rod or bar is joined to a ferrous metal hanger to which ferrous metal stubs are attached. In either case, a connection is required between the anode rod and a ferrous metal member. Herein, the ferrous metal assembly shall be referred to in all cases as a stub whether the connection be directly to the stub or via a hanger which is subsequently connected to the stub. Service requirements dictate that the union be strong, have low electrical resistance and be unaffected by the heat that it is necessarily exposed to during use.

A similar arrangement is used in the cathode. One or more ferrous metal rods or collector bars are embedded in the carbonaceous portion of the cathode. The ferrous metal rod or collector bar is connected to a flexible connector which in turn is connected to the negative or cathode bus bar of the cell.

Copper is particularly suited to use as the anode rod or bar. However, copper is becoming in increasingly short supply and the price of the available material has risen sharply. Accordingly, a substitute material must be found. Aluminum metal or aluminum alloys such as that known as electrical conductor grade (EC) aluminum are good electrical conductors and would seem suited for this purpose. However, the oxide film normally present on aluminum effects current conductivity from the aluminum to the ferrous metal. Moreover, in prior attempts to use aluminum anode rods it has been found that a bolted connection is not satisfactory for aluminum because joint resistance becomes excessive as relaxation occurs through creep of the aluminum member. Solders are melted due to the heat of the cell. Fusion welding and brazing are ruled out because a brittle intermetallic layer is formed between the aluminum filler metals and the ferrous metal member of the assembly. The instant invention was developed against this background in the art.

SUMMARY OF THE INVENTION

It is an advantage of the instant invention that it provides a reliable electrical union between the two dissimilar metals, aluminum and ferrous metal. This is accomplished by providing a solid phase bonded aluminum-ferrous transition insert made by roll bonding to connect the aluminum conductor rod (which term is to be understood as including a flexible connector) to the ferrous metal member of the electrode assembly.

In one application of the instant invention, an electrolytic reduction cell is provided which comprises a lining which defines a cavity adapted to contain an electrolyte, and an anode disposed within the cavity. A flexible bus conductor is connected to an anode bus bar above the cavity in combination with an electrical connection plate attached to the flexible bus conductor and positioned above the cavity. A ferrous metal stub is embedded in and supports the anode. A ferrous metal plate having a soft aluminous plate roll bonded along one face thereto is affixed to the end of the stub not embedded in the anode. An aluminum conductor rod is welded to the aluminous plate roll bonded to the steel plate. Means are provided for holding the conductor rod and electrical connection plate in current transmitting contact.

Normally, at least the bottom section of the cell lining is part of the cathode. A ferrous metal rod or collector bar is embedded in this part of the lining. A ferrous metal plate may be affixed to the end of the rod not embedded in the electrode. If the instant invention is applied to this assembly, a soft aluminous plate is roll bonded along one face to the ferrous plate affixed to the rod. An aluminum conductor rod (or flexible connector) is welded to the aluminous plate roll bonded to the ferrous plate and is adapted to be connected to the cathode bus bar. When an electrical power source is connected across the anode bus bar and cathode bus bar, electrical current will flow between the anode and cathode via the electrolyte contained in the cavity.

According to one embodiment of the invention the ferrous metal plate is welded to the ferrous metal stub. In another embodiment, the ferrous metal plate is bolted to the stub, the head of the bolt may be recessed in a hole provided in the aluminous plate of the assembly. Another variation of the bolted joint involves roll bonding a second ferrous metal plate to the opposite side of the aluminous plate from the first ferrous plate. In this way when the aluminous plate is welded to the aluminum conductor rod the ferrous plates are adapted to extend along opposite sides of the stub and the bolt can pass through both of them.

BRIEF DESCRIPTION OF THE DRAWINGS

FIG. 1 is a front elevational view partly in section of a reduction cell embodying the principles of the instant invention.

FIG. 2 is a front elevational view partly in section of an electrolytic cell embodying the principles of the instant invention.

FIG. 3 is a partial view of a connection between the rod and stub in accordance with the principles of the instant invention.

FIG. 4 is a partial view showing another form of the connection between the rod and stub in accordance with the instant invention.

FIG. 5 is a view of another connection between the rod and stub in accordance with the principles of the instant invention.

FIG. 6 is a view of another connection between the rod and stub in accordance with the principles of the instant invention.

DETAILED DESCRIPTION

Referring now to the drawings in which the same reference numerals have been applied to corresponding parts, and with particular reference to FIG. 1, an aluminum reduction cell 10 is shown having a carbon lining 12 which defines a cavity indicated generally at 14 adapted to contain a molten aluminum pad 16 and an electrolyte or bath 18 consisting essentially of alumina dissolved in cryolite. Carbon lining 12 is supported by a shell 20 of suitable material such as steel, a layer of insulation 22 being provided between lining 12 and shell 20. Within the shell 20 is disposed one or more carbon anodes 24. Anodes 24 may be of the prebaked type as shown in FIG. 1 or the continuous or self-baking or Soderberg type as shown in FIG. 2. A ferrous metal stub 26 is embedded in and supports the anode. As shown in FIG. 1, stub 26 may in reality consist of two pieces, a bracket plate 26a and a stub 26 proper. An anode bus bar 28 is positioned above cavity 14.

A ferrous metal plate 30 is affixed in an appropriate manner to the end of stub 26 not embedded in the anode. If desired, additional material such as a furane binder or cast iron may be used to insure that the stub 26 is properly embedded in and supports the anode 24. As has been discussed hereinabove and as shall be discussed more fully hereinafter, the ferrous metal plate may be affixed in divers ways to the end of stub 26. In the embodiments shown in FIGS. 1 and 2, ferrous metal plate 30 is fusion welded to stub 26. A soft aluminous plate 32 is roll bonded along one face to plate 30. Commercially pure aluminum, i.e. that known as 1100 grade aluminum is acceptable for this purpose or electrical conductor grade (EC) aluminum is also acceptable for this purpose. In any event, the aluminum or aluminum base alloy should be readily plastically deformable at the bonded temperature.

Although there is still some conjecture as to exactly what happens in a roll bonding operation, it is thought that elongation of the bond element fragments oxide films on both the aluminous element and the ferrous element of the sandwich and allows metal-to-metal contact without an interfering oxide film.

An aluminum anode or conductor rod 34 is welded to the aluminum plate 32 roll bonded to plate 30. Appropriate means such as clamp 36 are provided for holding the conductor rod 34 and anode bus bar 28 in current transmitting contact. A ferrous metal cathode rod or collector bar 38 is connected to a cathode bus bar 40 in an appropriate manner as by flexible connector 42. The cathode rod 38, shown here embedded in carbon lining 12, is in any event positioned in the cell 10 so that when an electrical power source, not shown, is connected across the anode bus bar 28 and the cathode bus bar 40, electrical current will flow between the anode 24 and the cathode system, comprising the collector bar 38, lining 12 and molten aluminum pad 16 via the electrolyte or bath 18 contained in cavity 14.

As shown in FIGS. 1 and 2 the connection between cathode rods 38 and flexible connectors 42 can be made in a manner similar to the connection between the anode rod 34 and stub 26. That is, a transition insert of the same type can be used with the ferrous metal plate 30 of the insert affixed to the end of the collector bar or cathode rod 38. The soft aluminous plate 32 is roll bonded along one face to the ferrous plate 30 affixed to the stub or collector or cathode rod 38. The flexible connector, or aluminum conductor rod, is welded to the aluminous plate 32 roll bonded to the ferrous metal plate 30. It is then connected in an appropriate manner to cathode bus bar 40 which in turn is connected to a source of electric current as has been explained previously.

The embodiment shown in FIG. 3 is similar to that of FIG. 1 with the exception that only a single rather than a double stub 26 is connected by means of the transition insert. The anode rod 34 is welded to the aluminous plate 32 and the ferrous metal stub 26 is welded to the ferrous metal layer or plate 30.

FIGS. 4 and 5 show a slightly different assembly. Here, the transition insert contains a layer of ferrous metal 30 and a layer of aluminous material 32 or, in the case of FIG. 5, a central ferrous metal layer 30 to which layers of aluminous material 32 have been roll bonded on both sides. The construction shown in FIGS. 4 and 5 permit the use of a bolted union beause the bolting is effected between the plate 30 of the insert and the ferrous metal stub 26 of the assembly, a union that is serviceable in reduction cells. The aluminous layers or plates 32 of the insert can be trimmed back to leave a projecting length of ferrous metal plate 30. In such case, the projecting length of ferrous metal must be of sufficient cross sectional area to carry the electrical current. Alternatively, as shown in FIG. 5, a hole large enough to accommodate the head of the attaching bolt can be cut in the aluminous plate 32 and a smaller one in the ferrous metal plate 30 to accommodate the shaft of the bolt. The aluminous plate 32 would carry current to the portions of the ferrous plate 30 that are held in contact with the stub 26 by bolting pressure. In such case, the current carrying capacity of the ferrous plate 30 depends on the cross sectional area of bolting contact and a relatively thin layer of ferrous metal would suffice.

In FIG. 6 is shown an assembly composed of an insert containing a central aluminous plate 32 to which ferrous metal plates 30 have been roll bonded on both sides. This construction also enables bolting to be used to connect the anode assembly to a stub 26 or similar member.

As an example of the practice of the instant invention, plates of ¾" thick electrical conductor grade aluminum were degreased and abrasively cleaned using a 150 grit belt sander. Electrical conductor grade aluminum is 99.45% pure aluminum. This is essentially a slightly higher purity than commercially pure or 1100 grade aluminum which is 99% pure aluminum. Plates of ¼" to ½" thick type 304 stainless steel were also degreased and belt sanded through the rolling mill. Table II summarizes bend tests on all materials.

TABLE I.—ROLL-BONDED ALUMINUM-STEEL FOR AGING TESTS

| Type | Pack [1] | Aluminum | | Steel | | Nominal paying area | Rolling temp., °F. | Nominal | |
|---|---|---|---|---|---|---|---|---|---|
| | | Alloy | Original thickness, in. | Alloy | Original thickness, in. | | | Reduction, percent | Finish thickness, in. |
| A | Bilayer | EC | 0.75 | 304 stainless | 0.50 | 6" x 16" | 700-740 | 16 | 1.05 |
| B | do | EC | 0.75 | Bridge steel [2] | 0.49 | 6" x 16" | 550-570 | 14 | 1.07 |
| C | Double bilayer | [2] 3003 | 0.75 | 304 stainless | 0.25 | 36" x 140" | 775 | 16 | 0.84 |
| D | Bilayer | 1100 | 0.75 | 1020 [2] | 0.25 | 3" x 12" | 570 | 19 | 0.81 |

[1] Bilayer, one aluminum plate and one steel plate per pack. Double bilayer, two steel plates in center, with two outside alumi num plates.
[2] Bridge steel, a 0.26% carbon steel with 0.33% Si and a maximum of 1.30% Mn; 3003, 0.6 Si, 0.7 Fe, 0.20 Cu, 1.0-1.5 Mn, 0.10 Zn, others 0.05 each, 0.15 total, balance aluminum, 1020, 0.18-0.23 C, 0.30-0.60 Mn, 0.040 P, max., 0.050 S, max., balance iron.

using a 150 grit abrasive belt. The composition of 304 stainless steel may be expressed as 0.06% carbon, 1.84% manganese, 0.02% phosphorous, 0.01% sulfur, 0.54% silicon, 9% nickel, 18% chromium, 0.25% molybdenum, 0.21% copper, and 0.10% cobalt with the remainder essentially iron. The composition limits of type 304 stainless steel are 18–20% chromium, 8–11% nickel, 0.08% maximum carbon, manganese 2.0% maximum, the balance essentially iron. The cleaned plates were laid together so the sanded faces were in contact with each other. The laid up pack was heated to 550° F. and reduced by rolling in a single pass through a rolling mill to a thickness of 0.79 inch. Material was cut into 3¼ inch wide and 5 inch long pieces. An aluminum anode rod was gas metal-arc fusion welded to the aluminum layer and the stainless steel layer of the transition insert piece was fusion welded to the ferrous metal member of the anode assembly (the stub). Nine anode assemblies made using this roll bonded material were installed in a 30,000 ampere prebaked electrode aluminum reduction cell. Eight similar assemblies were made with an explosion bonded or welded 1100 grade aluminum-1008 carbon steel. The carbon steel known commercially as 1008 carbon steel has a carbon content that must not exceed 0.15 weight percent. The nominal composition of 1008 carbon steel is 0.10 maximum carbon, 0.25–0.50 manganese, 0.040 maximum phosphorous, 0.050 maximum sulfur, balance essentially iron. Five of the explosion welded assemblies failed by delamination in use but all the assemblies made in accordance with the instant invention operated satisfactorily. The superiority of the instant invention is tentatively attributed to a superior metallurgical union achieved by the roll bonding techniques.

A series of artificial aging tests were then conducted to compare the efficacy of various alloys and bonding techniques. These tests substantiated that the roll bonding technique provides a superior material for the instant invention. The original material thicknesses and alloys, rolling temperatures, and deformations are listed in Table I. All transition materials used similar roll bonding procedures. Plate materials were degreased and then abrasive ground. The packs were assembled and heated to or slightly above rolling temperature and then rolled in a single pass

TABLE II.—BEND TEST AFTER ELEVATED TEMPERATURE AGING

[Samples ⅙-inch thick slices]

| Transition material | Time at temperature | Exposure temperature, °F. | | | |
|---|---|---|---|---|---|
| | | 930 | 800 | 660 | 540 |
| EC/304, roll bonded. | 1 day | OK | — | — | — |
| | 1 week | Broke | OK | OK | — |
| | 1 month | do | OK | OK | — |
| EC/bridge steel roll bonded. | 1 day | OK | — | — | — |
| | 1 week | Broke | OK | OK | — |
| | 1 month | do | OK | OK | — |
| 3003/304, roll bonded. | 1 day | Broke | — | — | — |
| | 1 week | do | OK | OK | — |
| | 1 month | do | OK | OK | — |
| 1100/1008, explosion bonded. | 6 hr | Broke | Broke | OK | OK |
| | 1 day | do | do | do | OK |
| | 1 week | do | do | Broke | OK |
| | 1 month | do | do | do | — |
| 1100/1020, roll bonded. | 1 day | OK | — | — | — |
| | 1 week | Broke | OK | OK | — |
| | 1 month | — | OK | — | — |

NOTE.—Broke=Fracture at interface, no deformation, usually with finger pressure; OK=90° bend at interface, no separation; —=Not tested. All five material combinations passed 90° bend, before elevated temperature exposure.

Metallographic examination of the samples of 1100–1008 explosion bonded and the 1100/1020 after an exposure of one month at 800° F. revealed an appreciable intermetallic layer in the explosion bonded and no intermetallic formation in the roll bonded material. The roll bonded sample passed a bend test while the explosion bonded material failed. Examination of a failed explosion bonded piece showed that fracture occurred along an intermetallic layer.

While there have been shown and described hereinabove possible embodiments of this invention, it is to be understood that the invention is not limited thereto and that various changes, alterations, and modifications can be made thereto without departing from the spirit and scope thereof as defined in the appended claims wherein:

What is claimed is:
1. An electrolytic reduction cell comprising:
 (a) a lining which defines a cavity adapted to contain an electrolyte;
 (b) an anode disposed within the cavity;
 (c) an anode bus bar positioned above the cavity;

(d) a ferrous metal stub embedded in and supporting the anode;
(e) a ferrous metal plate affixed to the end of the stub not embedded in the anode;
(f) a soft aluminous plate roll bonded along one face to the ferrous plate affixed to the stub;
(g) an aluminum conductor rod welded to the aluminous plate roll bonded to the ferrous plate;
(h) means for holding the conductor rod and anode bus bar in current transmitting contact;
(i) a cathode rod connected to a cathode bus bar and positioned in the cell so that when an electrical power source is connected across the anode bus bar and cathode bus bar, electrical current will flow between the anode and cathode via the electrolyte contained in the cavity.

2. The apparatus of claim 1 wherein the ferrous metal plate is a substantially stainless steel alloy plate.

References Cited
UNITED STATES PATENTS

| | | | |
|---|---|---|---|
| 3,398,081 | 8/1968 | Bonfils et al. | 204—286 |
| 3,404,081 | 10/1968 | Cummings et al. | 204—286 X |
| 3,424,668 | 1/1969 | Fischer | 204—286 X |

JOHN H. MACK, Primary Examiner

D. R. VALENTINE, Assistant Examiner

U.S. Cl. X.R.

204—288